(12) United States Patent
Inoue et al.

(10) Patent No.: US 7,493,829 B2
(45) Date of Patent: Feb. 24, 2009

(54) FLOW METER FOR VARIABLE DISPLACEMENT COMPRESSOR

(75) Inventors: Yoshinori Inoue, Kariya (JP); Akinobu Kanai, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 0 days.

(21) Appl. No.: 11/690,336

(22) Filed: Mar. 23, 2007

(65) Prior Publication Data

US 2007/0227266 A1    Oct. 4, 2007

(30) Foreign Application Priority Data

Mar. 30, 2006    (JP) .................... P2006-093355

(51) Int. Cl.
    *G01F 1/22*       (2006.01)
(52) U.S. Cl. .................................. 73/861.57
(58) Field of Classification Search ............... 73/861.57
    See application file for complete search history.

(56) References Cited

U.S. PATENT DOCUMENTS

| 4,043,198 | A | * | 8/1977 | Stillwell et al. ............. 73/242 |
| 4,507,976 | A | * | 4/1985 | Banko ...................... 73/861.54 |
| RE32,157  | E | * | 5/1986 | Waugh et al. ............... 73/1.17 |
| 4,648,281 | A | * | 3/1987 | Morita et al. ............. 73/861.91 |
| 5,214,964 | A | * | 6/1993 | Hartfiel ..................... 73/861 |
| 5,440,925 | A | * | 8/1995 | Padden et al. ............. 73/253 |
| 5,456,107 | A | * | 10/1995 | Padden et al. ............. 73/239 |
| 7,130,750 | B1 | * | 10/2006 | Stevens et al. ............. 702/64 |
| 2007/0264131 | A1 | * | 11/2007 | Ota et al. ................... 417/43 |

FOREIGN PATENT DOCUMENTS

| JP | 60-152926 U | 10/1985 |
| JP | 60-209116 A | 10/1985 |
| JP | 62-056820 A | 3/1987 |
| JP | 62-259015 A | 11/1987 |
| JP | 62-259016 A | 11/1987 |
| JP | 09-257534 A | 10/1997 |
| JP | 2002-332962 | * 11/2002 |

* cited by examiner

*Primary Examiner*—Harshad Patel
(74) *Attorney, Agent, or Firm*—Knoble Yoshida & Dunleavy, LLC (57) ABSTRACT

A flow meter for a variable displacement compressor comprises a movable body operable to move by differential pressure, a magnet provided in the movable body, a magnetic sensor for detecting change of magnetic flux density of the magnet, a flow passage for refrigerant gas which is discharged from cylinder bores to flow therethrough, a sealed chamber connected perpendicularly to the flow passage and accommodating therein the movable body, an urging member for urging the movable body into the flow passage, a clearance formed between a movable body and an inner wall surface of the flow passage, a by-pass passage opened and closed as the movable body is moved in an axial direction of the movable body, and a communication passage for introducing into the sealed chamber the refrigerant gas in a downstream flow passage of the flow passage which is located downstream of the movable body.

12 Claims, 10 Drawing Sheets

FLOW METER FOR VARIABLE DISPLACEMENT COMPRESSOR

BACKGROUND OF THE INVENTION

The present invention relates to a flow meter which is operable magnetically to detect a body which is movable in response to a change of flow rate of refrigerant gas being discharged in a variable displacement compressor.

Japanese Patent Application Publication No. 2002-332962 discloses a variable displacement compressor (hereinafter referred to merely as compressor) in which the inclination angle of a swash plate is varied by adjusting the opening degree of a control valve, thus the displacement of the compressor being changed. In the present specification, the displacement of the compressor refers to the flow rate or the volume of refrigerant gas discharged per one rotation of the compressor.

In a conventional compressor, although a flow rate changing command is merely sent in controlling and changing the displacement, actual displacement is not known. As the displacement is changed, and the power of the compressor is varied, actual displacement is estimated by a calculated value based on a flow rate command value.

Thus, the actual displacement is different from the calculated value until the displacement reaches a specified value after the flow rate changing command has been sent. Especially, when the compressor is started at start-up of a vehicle engine, the above difference is increased. Thus, it takes a longer time for the vehicle interior temperature to reach a desired level, and a greater load acts on the vehicle engine. Namely, appropriate control is hard to be performed under this situation.

If a flow rate of the refrigerant gas being discharged in the compressor is accurately detected, the actual displacement and the actual power of the compressor can be known, which is very useful. For the above purpose, an electric flow meter which is disclosed in Japanese Utility Model Application Publication No. 60-152926 (cf. FIG. 2) may be used for detecting the flow rate of the refrigerant gas.

The electric flow meter of Japanese Utility Model Application Publication No. 60-152926 has a valve seat formed in the horizontal partition wall of a box and having a valve hole. The space above the horizontal partition wall is divided into two spaces by a drive plate which is integral with a movable membrane. A valve body is connected to the drive plate and urged by a spring in the direction which causes the valve body to be inserted into the valve hole. The space between the horizontal partition wall and the drive plate is in fluid communication with a fluid passage through which high-pressure fluid flows. A part of low-pressure fluid which has passed through the valve hole is supplied to the space above the drive plate through a communication passage.

Thus, the valve body is movable vertically in the valve hole by the differential pressure between the high-pressure fluid in the spaces below the drive plate and low-pressure fluid in the space above the drive plate thereby to change the clearance between the valve seat and the valve body, thus forming a variable throttle. The displacement of the valve body by the above differential pressure is detected by a transducer which sends out an electric signal corresponding to the flow rate.

However, the electric flow meter of Japanese Utility Model Application Publication No. 60-152926 has the valve seat and the valve body cooperating to form a variable throttle, the movable membrane and the drive plate for supporting the valve body, and means for defining the spaces for the high-pressure and low-pressure fluids. The electric flow meter is made inevitably large in size. Thus, the electric flow meter is hard to be mounted on a compressor which is installed in a limited space of a vehicle.

In view of a device, the above downsizing problem in Japanese Utility Model Application Publication No. 60-152926 can be solved by providing a variable throttle mechanism formed by a combination of a flow passage for refrigerant gas and a movable body such as a spool or the like so that a differential pressure is created between the two points for moving the movable body.

In the above manner of sliding the movable body, however, the flow passage of the refrigerant gas has a gap formed between the sliding portion of the movable body and the inner surface of the flow passage. Thus, though depending on a setting, the fluid leaks easily through the gap of the sliding portion. Especially, the differential pressure cannot be large enough in a low flow rate region of the compressor immediately after the compressor has been started up. Thus, the differential pressure is not changed in a linear manner.

The diameter of the flow passage for the refrigerant gas may be reduced as much as possible for alleviating the influence of fluid leak thereby to increase the differential pressure between the two points and to change the differential pressure in a linear manner in the low flow rate region. However, since the flow of the fluid is substantially throttled in the low flow rate region, the differential pressure becomes beyond restraint or it is changed in a nonlinear manner in a high flow rate region of the compressor. Thus, when downsized, the conventional flow meter cannot accurately detect the flow rate.

When the diameter of the flow passage is reduced in the compressor for enhancing the throttling effect, resistance against the flow of fluid is increased, thus leading to reduction of cooling efficiency of the compressor. The reduction of cooling efficiency due to the increased fluid resistance cannot be overlooked particularly during the high load operation which requires a high flow rate for a large cooling capacity. On the other hand, when the diameter of the flow passage is increased in the compressor for ensuring sufficient cooling capacity in the high flow rate, the movable body must be made with a diameter that is larger than that of the flow passage for establishing a closed state of the flow passage and the flow meter is accordingly made large in size.

The present invention is directed to a flow meter which has a simple structure for use in a compressor, detects flow rate accurately in a wide range from a low flow rate region to a high flow rate region and prevents cooling efficiency from being lowered in the high flow rate region.

SUMMARY OF THE INVENTION

An aspect in accordance with the present invention provides a flow meter for a variable displacement compressor which comprises a housing having a plurality of cylinder bores, a drive shaft provided in the housing, pistons disposed in the cylinder bores, and a swash plate provided on the drive shaft. The pistons are driven by the swash plate, and an inclination angle of the swash plate is controlled for controlling a displacement of the compressor. The flow meter includes a movable body operable to move by differential pressure, wherein the movable body is arranged perpendicularly to the flow passage, a magnet provided in the movable body, a magnetic sensor for detecting a change in magnetic flux density of the magnet, a flow passage for refrigerant gas which is discharged from the cylinder bores to flow therethrough, a sealed chamber connected perpendicularly to the flow passage and accommodating therein the movable body, an urging member for urging the movable body into the flow passage, a clearance formed between a movable body and an inner wall surface of the flow passage, wherein the clearance is always provided as a part of the flow passage, a by-pass passage opened and closed as the movable body is moved in an axial direction of the movable body, and a communication passage for introducing into the sealed chamber the refrigerant gas in a downstream flow passage of the flow passage which is located downstream of the movable body.

A flow meter for a variable displacement compressor which comprises a housing having a plurality of cylinder bores, a drive shaft provided in the housing, pistons disposed in the cylinder bores and a swash plate provided on the drive shaft, the pistons being driven by the swash plate, an inclination angle of the swash plate being controlled for controlling a displacement of the compressor, the flow meter which comprises a flow passage for flowing refrigerant gas which is discharged from the cylinder bores, a sealed chamber connected perpendicularly to the flow passage, a movable body operable to move in the sealed chamber by differential pressure, and at least one by-pass passage that is separate from the flow passage for being opened and closed when the movable body moves over a predetermined point in the sealed chamber for controlling an additional amount of the refrigerant gas to flow from the cylinder bores.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
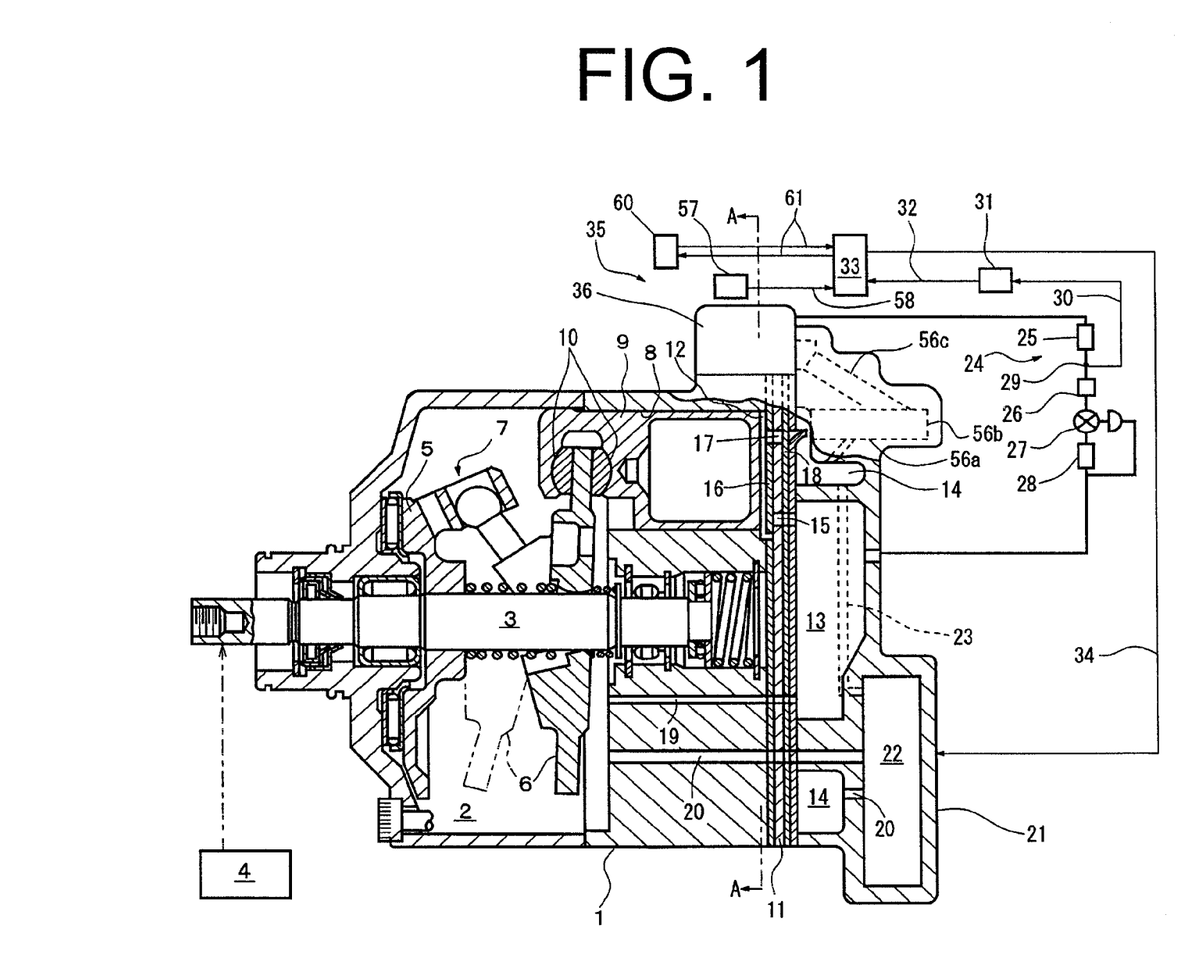
FIG. 1 is a longitudinal cross-sectional view of a variable displacement compressor of a first preferred embodiment according to the present invention.

The following will describe a first preferred embodiment of a flow meter for a variable displacement compressor according to the present invention with reference to FIGS. 1 though 8. Referring to FIG. 1 showing the variable displacement compressor having the flow meter of the first preferred embodiment, the compressor includes a housing 1 in which a crank chamber 2 is defined and a drive shaft 3 which is rotatably disposed in the crank chamber 2. The drive shaft 3 is operatively connected to an engine 4 which is mounted in a vehicle for rotation with the engine 4.

A lug plate 5 is fixed on the drive shaft 3 for rotation therewith in the crank chamber 2. A swash plate 6 is accommodated in the crank chamber 2. The swash plate 6 is provided and supported on the drive shaft 3 at an inclination angle so that the swash plate 6 is inclinable relative to the axis of the drive shaft 3 and also slidable relative to the drive shaft 3. A hinge mechanism 7 is disposed between the lug plate 5 and the swash plate 6, allowing the swash plate 6 to rotate with the lug plate 5 and the drive shaft 3 and to incline relative to the axis of the drive shaft 3. The inclination angle of the swash plate 6 is controlled by a displacement control device 21 which will be described later.

A plurality of cylinder bores 8 is formed in the housing 1 (only one being shown in FIG. 1). A single-headed piston 9 is reciprocally disposed in each of the cylinder bores 8. Each piston 9 is engaged with the outer peripheral portion of the swash plate 6 through a pair of shoes 10. Thus, the rotation of the swash plate 6 by the rotation of the drive shaft 3 is converted into reciprocating movement of the pistons 9 through the shoes 10.

Compression chambers 12 are defined in the cylinder bores 8 on the back side (the right side in FIG. 1) thereof by the pistons 9 and a valve-port assembly 11, which is provided in the housing 1. A suction chamber 13 forming a part of a suction-pressure region of the compressor and a discharge chamber 14 forming a part of a discharge-pressure region of the compressor are defined in the back side of the housing 1.

As the piston 9 moves from its top dead center toward its bottom dead center, refrigerant gas in the suction chamber 13 is drawn into the compression chamber 12 through a suction port 15 and a suction valve 16, which are formed in the valve-port assembly 11. As the piston 9 moves from its bottom dead center toward its top dead center, the refrigerant drawn in the compression chamber 12 is compressed to a predetermined pressure and discharged into the discharge chamber 14 through a discharge port 17 and a discharge valve 18, which are formed in the valve-port assembly 11.

A bleed passage 19 and a supply passage 20 are provided in the housing 1. The bleed passage 19 connects the crank chamber 2 to the suction chamber 13, while the supply passage 20 connects the discharge chamber 14 to the crank chamber 2. The displacement control device 21 having a control valve 22 is arranged in the supply passage 20 in the housing 1.

The control valve 22 is connected to the discharge chamber 14 through a first pressure-introducing passage 23 and to an external refrigerant circuit 24 which will be described in detail later through a second pressure-introducing passage (not shown). The opening degree of the control valve 22 is adjusted based on a control signal and differential pressure between the two points in the above pressure-introducing passages.

The pressure in the crank chamber 2 depends on the balance between the amount of high-pressure refrigerant gas introduced from the discharge chamber 14 into the crank chamber 2 through the supply passage 20 and the amount of the refrigerant gas flowing out from the crank chamber 2 into the suction chamber 13 through the bleed passage 19, whose balance is controlled by adjusting the opening degree of the control valve 22 of the displacement control device 21. The pressure difference between the compression chamber 12 and the crank chamber 2 across the piston 9 is changed in response to a change of the pressure in the crank chamber 2, thereby varying the inclination angle of the swash plate 6 relative to the drive shaft 3. Thus, the compressor changes the stroke of the piston 9 and hence its displacement.

As the pressure in the crank chamber 2 falls, the inclination angle of the swash plate 6 is increased thereby to increase the displacement of the compressor. The swash plate 6 indicated by the two-dot chain line in FIG. 1 is inclined at its maximum inclination angle in contact with the lug plate 5. On the other hand, as the pressure in the crank chamber 2 rises, the inclination angle of the swash plate 6 is decreased thereby to reduce the displacement of the compressor. The swash plate 6 indicated by the solid line in FIG. 1 is inclined at its minimum inclination angle.

The refrigerant circuit (or refrigeration cycle) of a vehicle air-conditioner includes the above-described compressor and the external refrigerant circuit 24, which connects the discharge chamber 14 to the suction chamber 13. Carbon dioxide or chlorofluorocarbon is used as refrigerant. The external refrigerant circuit 24 includes a condenser 25, a receiver tank 26, an expansion valve 27 and an evaporator 28, which are arranged in this order as viewed from the discharge chamber 14 toward the suction chamber 13. A pressure sensor 29 is arranged in the refrigerant passage which connects the condenser 25 to the receiver tank 26 and adapted to send out electrical detection signals to an amplifier 33 through a connecting line 30, a data inputting means 31 and a connecting line 32. The amplifier 33 transmits a displacement-changing command signal to the displacement control device 21 through a connection line 34 for controlling the displacement control device 21.

Figure 2:
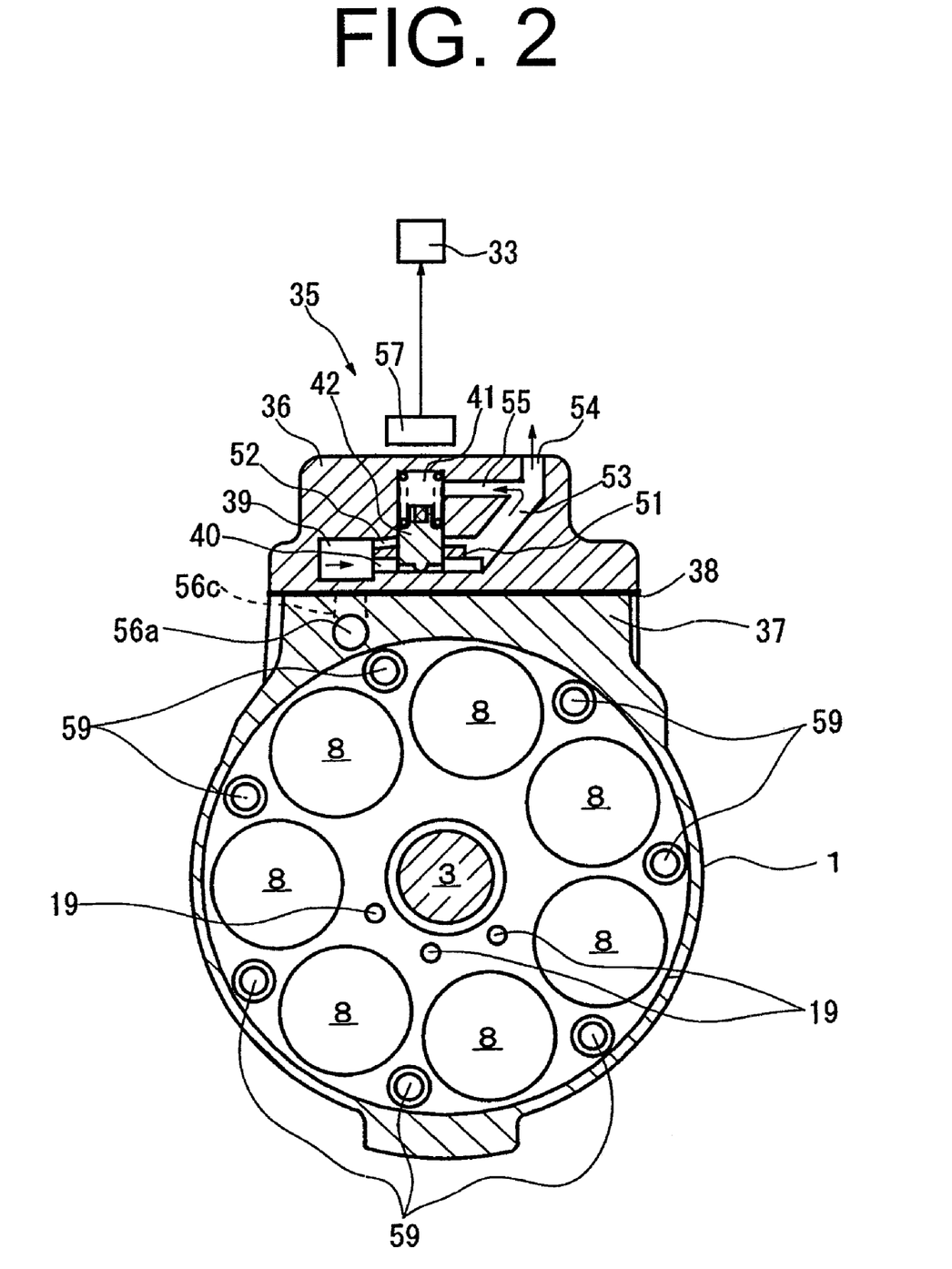
FIG. 2 is a cross-sectional view taken along the line A-A in FIG. 1.

A flow meter 35, which is shown in detail in FIGS. 2 through 6 is provided on the upper surface of the housing 1. More specifically, a part of the flow meter 35 is provided in a flange 36 which is a part of the housing 1. The flange 36 is fixed to a cylinder block 37 of the housing 1, and a gasket 38 is interposed between the flange 36 and the cylinder block 37 as shown in FIG. 2.

Referring to FIG. 2, a high-pressure chamber 39 and a flow passage 40, which is in communication therewith are formed in the flange 36. A cylindrical sealed chamber 41 is formed in the flange 36, extending in a perpendicular direction to the flow passage 40 for connection therewith. A cylindrical movable body or a spool 42 is accommodated in the sealed chamber 41 so as to be slidable in the axial direction of the spool 42.

Figure 3:
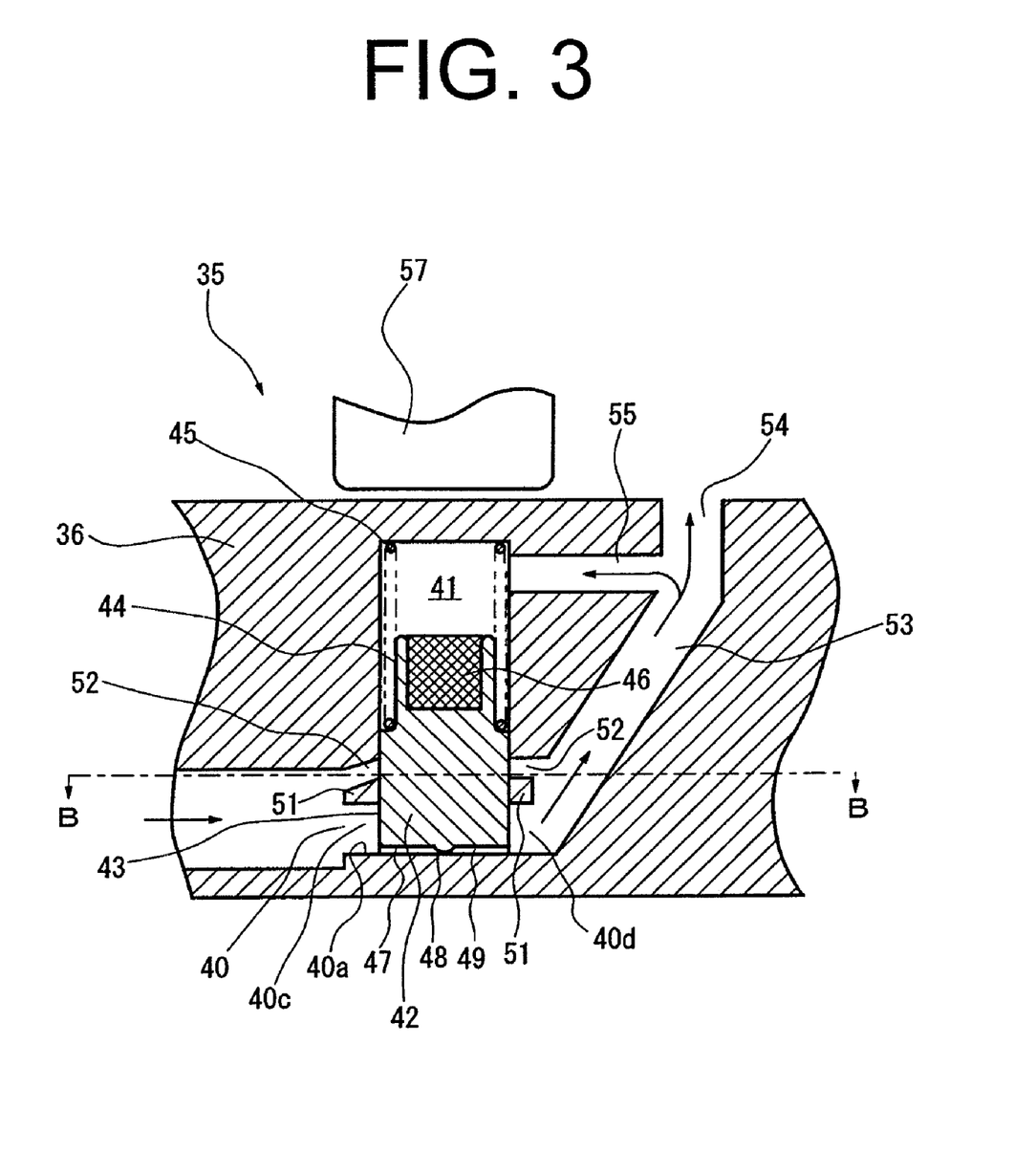
FIG. 3 is a partially enlarged cross-sectional view of a flow meter of the first preferred embodiment in a low flow rate region.

Referring to FIG. 3, the spool 42 has at its upper portion a reduced or small-diameter portion 44. A coil spring 45 is provided in the clearance which is formed between the upper small-diameter portion 44 of the spool 42 and the inner wall of the sealed chamber 41 for urging the spool 42 downwardly as seen in FIG. 3. The coil spring 45 has a predetermined spring constant so that the spool 42 is located at a predetermined position when the spool 42 receives differential pressure which will be described later. A magnet 46 is embedded in the upper small-diameter portion 44 of the spool 42.

Figure 4:
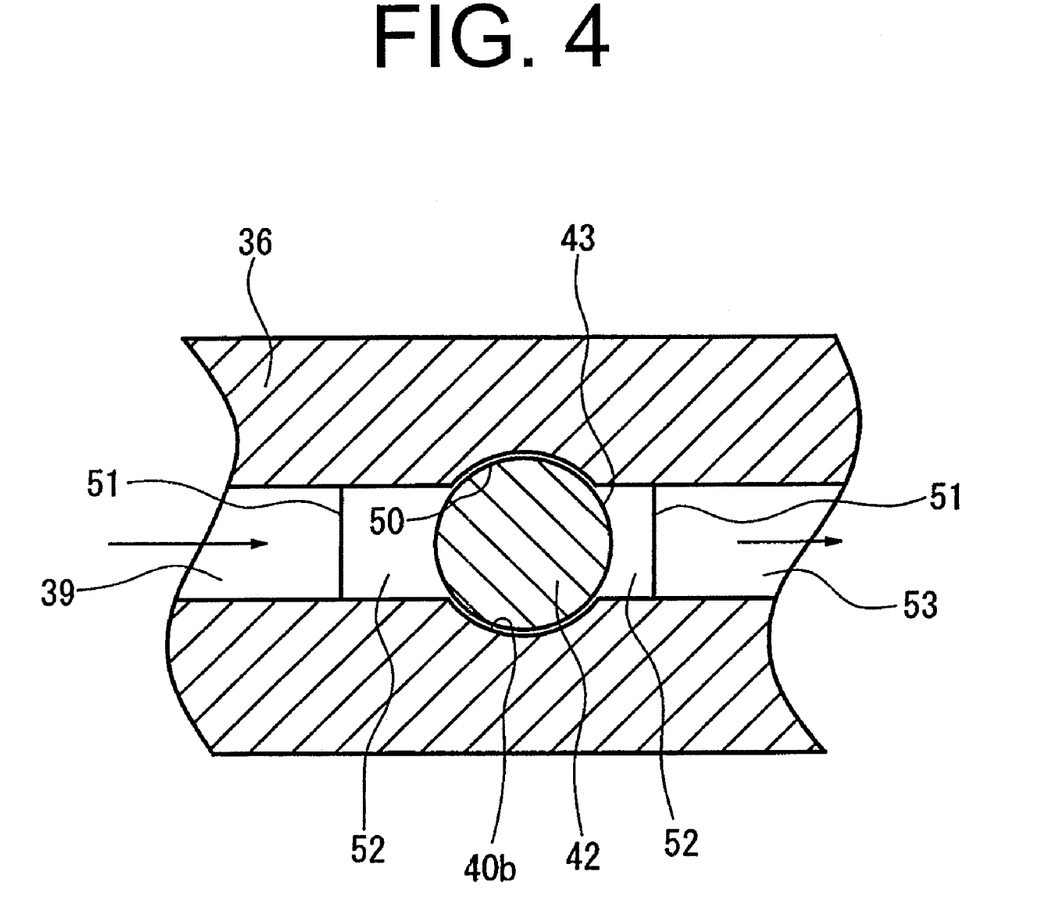
FIG. 4 is a cross-sectional view taken along the line B-B in FIG. 3.
Figure 5:
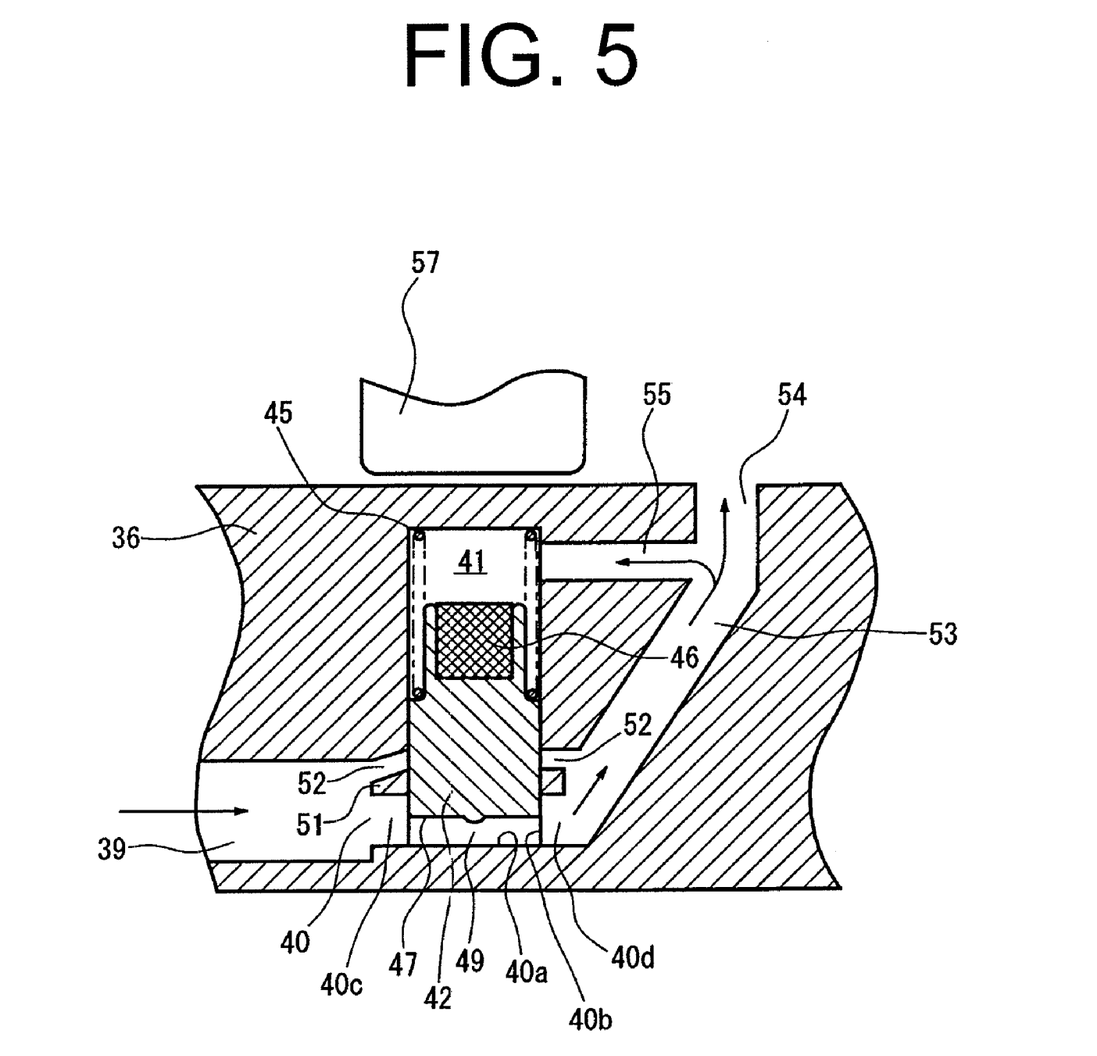
FIG. 5 is a partially enlarged cross-sectional view of the flow meter of the first preferred embodiment in an intermediate flow rate region.

Referring to FIG. 4, a minute clearance 50 is formed between the lower large-diameter portion 43 of the spool 42 and the inner wall surface 40b of the sealed chamber 41 with such a width that allows sliding movement of the spool 42. A projection 48 (FIG. 3) is formed on the lower end surface 47 of the spool 42. The projection 48 is brought into contact with the inner wall surface 40a of the flow passage 40 when the spool 42 is fully urged against the flow passage 48. Thus, a clearance 49 is always provided between the spool 42 and the inner wall surface 40a of the flow passage 40. The clearance 49 is a part of the flow passage of the present invention through which refrigerant gas flows. The lower end surface 47 of the spool 42 serves as a pressure receiving surface.

Referring back to FIG. 3, flow passages 40c and 40d are located upstream and downstream of the movable body 42 in the flow passage 40, respectively, and a by-pass passage 52 is defined by partitions 51 above the upstream and downstream flow passages 40c and 40d. The by-pass passage 52 is closed by the outer peripheral surface of the lower large-diameter portion 43 of the spool 42 when it is placed in its fully-urged position. The by-pass passage 52 is kept closed until the lower end surface 47 of the spool 42 moves upward past the partitions 51.

The downstream flow passage 40d and the by-pass passage 52 which is located downstream of the spool 42 join together at a low-pressure chamber 53 which is defined in the flange 36 as shown in FIG. 3. The low-pressure chamber 53 branches into a main passage 54, which is connected to the external refrigerant circuit shown in FIG. 1 and a communication passage 55, which is connected to the sealed chamber 41 adjacent to the upper small-diameter portion 44 of the spool 42 at its up position in the sealed chamber 41.

Referring back to FIGS. 1 and 2, the discharge chamber 14 is connected to the high-pressure chamber 39 in the flange 36 through discharge passages 56a through 56e, so that a part of high-pressure refrigerant gas discharged into the discharge chamber 14 is supplied to the high-pressure chamber 39 and a small amount of refrigerant gas flows to the low-pressure chamber 53 from the high-pressure chamber 39 through the upstream flow passage 40c and the clearance 49 under a reduced pressure. The spool 42 in the sealed chamber 41 is then moved vertically in FIG. 3 by the differential pressure between the high-pressure fluid in the flow passage 40, which acts on the lower end surface 47 of the lower large-diameter portion 43 and the low-pressure fluid which is introduced into the sealed chamber 41 from the low-pressure chamber 53, which acts on the upper small-diameter portion 44. When the displacement of the compressor is changed by the displacement control device 21, the flow rate of the refrigerant gas discharged from the discharge chamber 14 is varied thereby changing the differential pressure which acts on the spool 42. Thus, the spool 42 is moved upward or downward in FIG. 3 in response to a change in the differential pressure. For example, as the displacement of the compressor is increased, the flow rate and hence the differential pressure are increased and the spool 42 is moved upward in FIG. 3, accordingly.

A magnetic sensor 57 is provided outside of the flange 36 and facing the magnet 46 of the spool 42. The magnetic sensor 57 is spaced at a predetermined clearance from the flange 36 for preventing the heat of the housing 1 from being transmitted directly to the magnetic sensor 57. The magnetic sensor 57 is connected to the amplifier 33 through a connecting line 58. In FIG. 2, the reference numeral 59 designates holes for receiving fixing bolts.

The following will describe the operation the flow meter 35 of the first preferred embodiment with reference to FIGS. 3 and 5 through 7.

Figure 7:
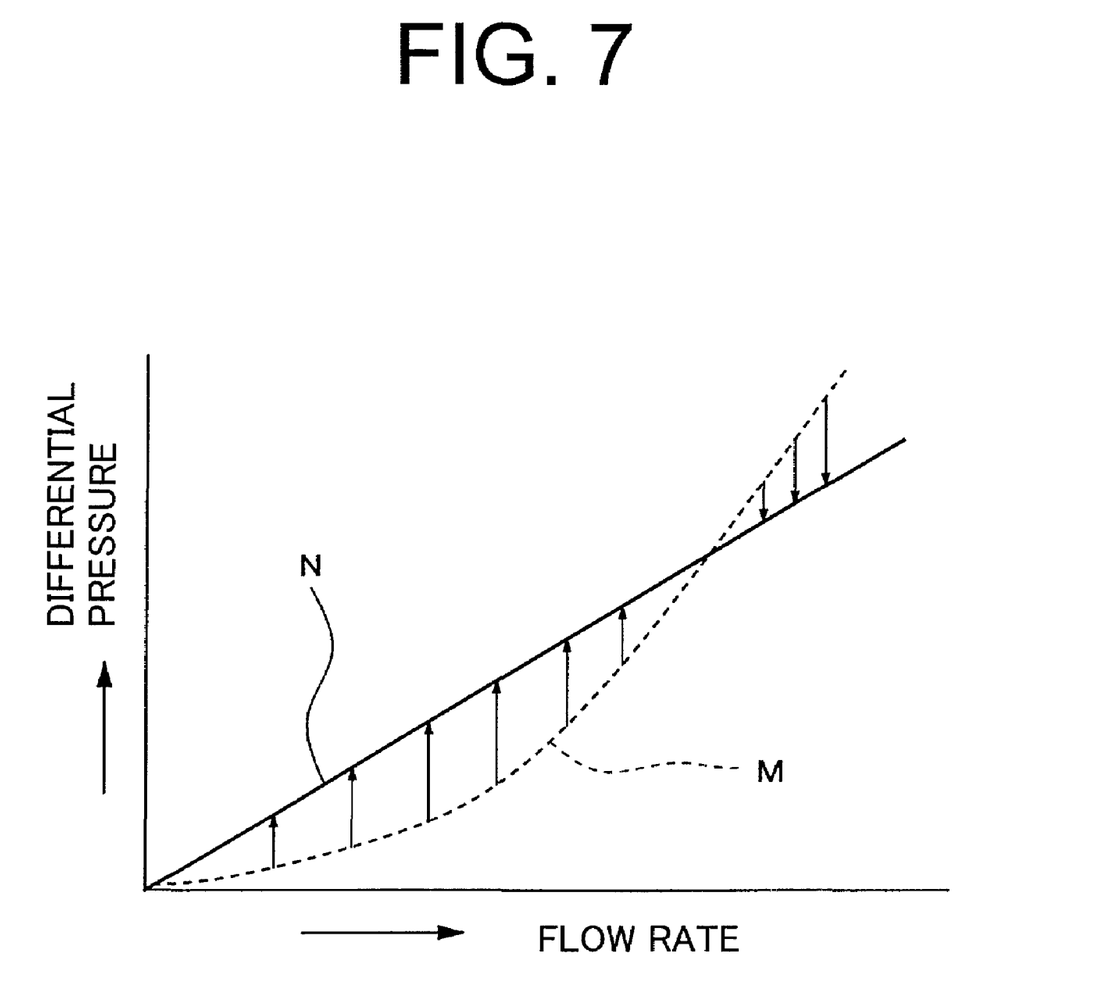
FIG. 7 is a diagram showing a relation between differential pressure and flow rate.

Firstly, reference is made to the diagram of FIG. 7. Generally, when a fixed throttle is used for creating differential pressure between two points, the relation between a flow rate and a differential pressure varies in a nonlinear manner as indicated by the dotted line M in the diagram of FIG. 7. As obvious from the dotted line M, the change in the differential pressure is small in a low flow-rate region and, therefore, it tends to be hard to detect accurately the differential pressure amount, while the change in the differential pressure is so large in a high flow-rate region that the flow meter must be made large in size for accurately detecting the differential pressure. Generally, using a variable throttle solves the above problems of the fixed throttle, and the differential pressure can be changed in a manner similar to a linear manner indicated by the solid straight line N.

When the variable throttle is used, however, the opening degree of the variable throttle needs to be set large for increasing the change of the differential pressure in the low flow rate region and to be set small for decreasing the change of the differential pressure in the high flow rate region. The flow meter of Japanese Utility Model Application Publication No. 60-152926 or any other flow meters using the conventional variable throttle have to be made large for ensuring substantial movement of the valve body even in the high flow rate region to satisfy the characteristics in the high and low flow rate regions. The flow meter 35 of the first preferred embodiment of the present invention can satisfy the characteristics in both of the high and low flow rate regions.

FIG. 3 shows a state where the displacement of the compressor is zero or the flow rate is zero. Therefore, there is no flow of refrigerant gas, and the spool 42 is fully urged by the coil spring 45 and placed into the flow passage 40. Consequently, the projection 48 thereof is in contact with the inner wall surface 40a of the flow passage 40 with the clearance 49 formed therebetween. The by-pass passage 52 is then closed by the spool 42 and the upstream flow passages 40c is in communication with the downstream flow passage 40d through the clearance 49.

When a small amount of refrigerant gas is discharged from the compressor, the refrigerant gas flows from the high-pressure chamber 39 through the clearance 49 into the low-pressure chamber 53 with a pressure reduced to a predetermined level. The high-pressure refrigerant gas in the upstream flow passage 40c acts on the lower end surface 47 of the spool 42 as the pressure-receiving surface thereby to urge the spool 42 upward.

A part of the low-pressure refrigerant gas in the low-pressure chamber 53 flows through the communication passage 55 into the sealed chamber 41 above the upper small-diameter portion 44 of the spool 42. The spool 42 is moved upward to such a position where the differential pressure between the pressure acting on the lower end surface 47 and the pressure acting on the upper small-diameter portion 44 balances with the urging force of the sprig 45. Thus, the clearance 49 between the lower end surface 47 of the spool 42 and the inner wall surface 40a of the flow passage 40 is increased thereby to increase the flow rate of the refrigerant gas flowing from the upstream flow passage 40c to the downstream flow passage 40d. Accordingly, the flow rate of the refrigerant gas flowing in the downstream flow passage 40d is increased with an increase of the displacement of the compressor. Therefore, the differential pressure can be changed in a manner similar to the linear manner of the solid line N in FIG. 7.

Figure 6:
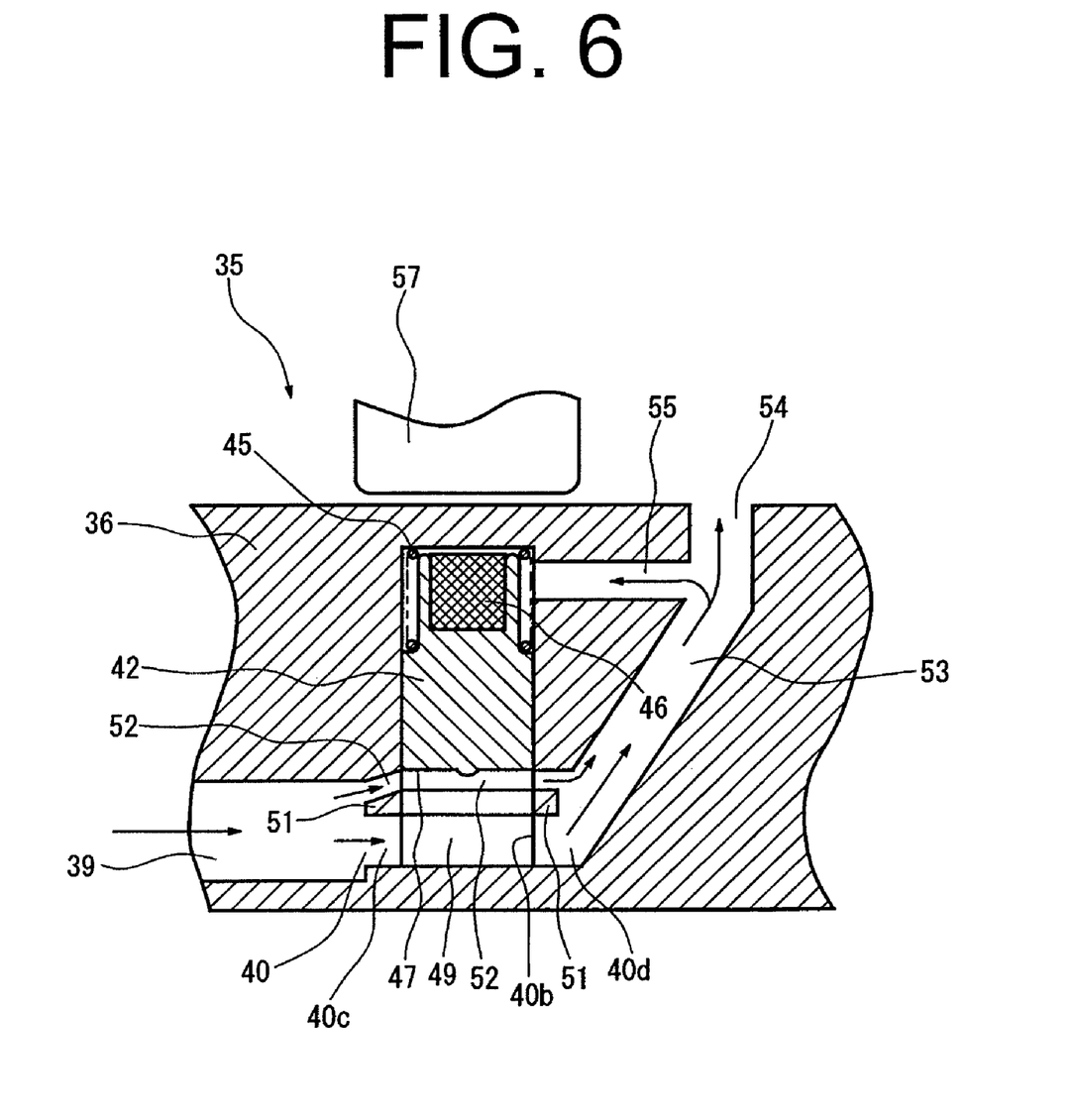
FIG. 6 is a partially enlarged cross-sectional view of the flow meter of the first preferred embodiment in a high flow rate region.

When the flow rate of the refrigerant gas discharged from the compressor is further increased and the compressor is operated in the high flow-rate region, the differential pressure is also further increased. Thus, the spool 42 is moved upward to a position beyond the partitions 51 as shown in FIG. 6 thereby to open the by-pass passage 52. Accordingly, a large amount of refrigerant gas flows from the high-pressure chamber 39 through the flow passage 40 and the by-pass passage 52 into the low-pressure chamber 53.

The opening degree of the by-pass passage 52 is increased with upward movement of the spool 42. Thus, the amount of the refrigerant gas flowing into the low-pressure chamber 53 is significantly increased. As a result, the change of the differential pressure is reduced in the high flow rate region, and the change of the differential pressure can approach the solid line N in FIG. 7 throughout the entire range from the low flow rate region to the high flow-rate region of the compressor.

As described above, the differential pressure is changed in a linear manner like the solid line N of FIG. 7 and, therefore, the spool 42 is moved in response to such a change of the differential pressure. Thus, the distance between the movable magnet 46 and the stationary magnetic sensor 57 is changed in a linear manner as the magnet 46 is moved from the state of FIG. 3 to the state of FIG. 5 or FIG. 6, with the result that the magnetic sensor 57 accurately detects the change in the magnetic flux density of the magnet 46. Since the detection data by the magnetic sensor 57 is accurate, the data concerning the flow rate which is calculated by the amplifier 33 is highly reliable.

In addition to the data concerning the flow rate of the refrigerant gas which is sent from the magnetic sensor 57, various information such as vehicle interior temperature provided from the data inputting means 31, a pulley ratio of the compressor and the pressure data on the refrigerant gas transmitted from the pressure sensor 29 is inputted to the amplifier 33. Further, information on the vehicle engine speed is inputted to the amplifier 33 from a vehicle engine controller 60 through a connecting line 61.

The amplifier 33 calculates the current displacement of the compressor based on the flow rate data of refrigerant gas which is provided by the magnetic sensor 57 and performs feedback control of the displacement control device 21. Thus, the displacement of the compressor is appropriately controlled.

In addition, torque of the compressor is calculated in real time based on the flow rate data of refrigerant gas which is provided by the magnetic sensor 57. Thus, the displacement of the compressor is controlled in response to the vehicle engine speed, and the calculated torque of the compressor is used for controlling the vehicle engine speed by feedback to the vehicle engine controller 60.

The above-described first preferred embodiment offers the following advantageous effects.

(1) The flow meter 35 of the embodiment has a simple structure in that the spool 42 is movable between the flow passage 40 for the refrigerant gas and the sealed chamber 41 connected perpendicularly thereto and also that the by-pass passage 52 is provided adjacently to the flow passage 40. Therefore, the flow meter 35 is made compact.

(2) The opening degrees of the flow passage 40 and the by-pass passage 52 are sequentially increased using the spool 42. By the synergetic effects of both of the passages 40 and 52, the differential pressure is changed in a substantially linear manner in the range from the low flow-rate region to the high flow-rate region, and the displacement of the compressor is detected in real time. Therefore, the displacement of the compressor and the vehicle engine speed are accurately controlled particularly in starting up the vehicle engine.

(3) Cooling capacity for cooling the vehicle interior has to be maximized in the high flow-rate region of the compressor. In the above-described embodiment, the by-pass passage 52 helps to increase the flow rate of discharged refrigerant gas, thus ensuring that a sufficient volume of refrigerant gas is provided for the maximum cooling capacity.

(4) When the spool 42 is moved into the flow passage 40, the spool 42 is guided by the partitions 51, which are located adjacently to the upstream and downstream flow passages 40c and 40d so that the vertical movement of the spool 42 is stabilized.

(5) Since the spool 42 is arranged perpendicularly to the flow passage 40, the flow rate is detected only based on the differential pressure between static pressure acting on the lower end surface 47 of the spool 42 and static pressure in the sealed chamber 41 without the influence of dynamic pressure of the fluid. Compared with a conventional detecting device wherein a spool is disposed with its lower end surface facing against the flow of fluid, the flow meter 35 according to the first embodiment of the present invention detects a wider range of the flow rate than the conventional device if the stroke lengths of the spools are the same. In other words, if the flow rate detecting range is the same, the stroke length of the spool 42 is shorter and the flow meter 35 is made smaller, according to the present invention.

(6) In general, the diameter of the spool 42 has to be larger than that of the flow passage 40 and the by-pass passage 52 for preventing leak of refrigerant gas. However, since the by-pass passage 52 is formed independently of the flow passage 40, the diameters of the flow passage 40 and the by-pass passage 52 can be set small according to the current invention. Thus, the diameter of the spool 42 is optimally set small and the flow meter 35 is made small, according to the current invention.

Figure 8:
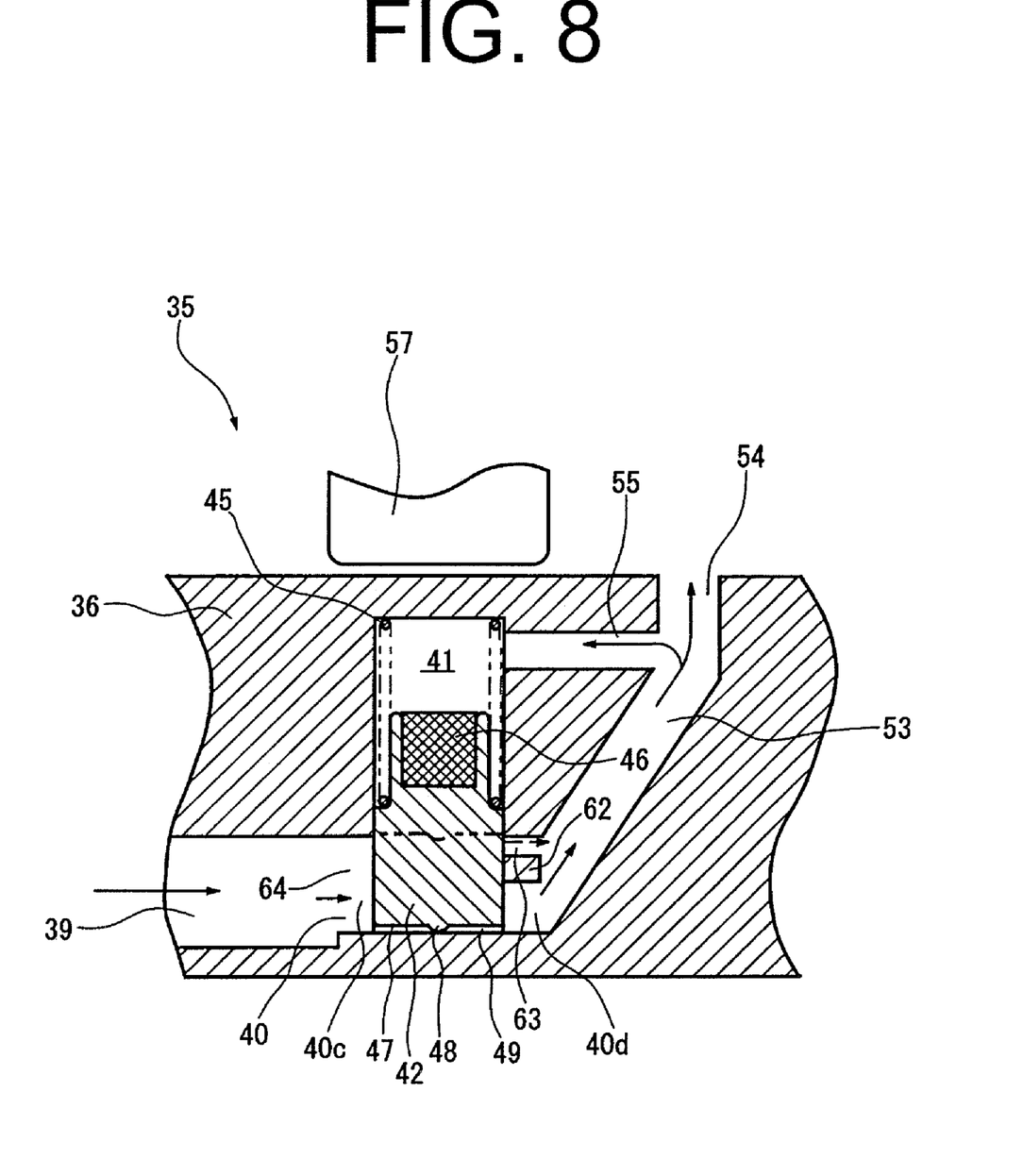
FIG. 8 is a partially enlarged cross-sectional view of a flow meter of a second preferred embodiment.

The following will describe a second preferred embodiment of a flow meter for a variable displacement compressor according to the present invention with reference to FIG. 8. The second preferred embodiment differs from the first preferred embodiment in that the by-pass passage 52 is modified. The same reference numerals will be used to denote those components or elements which correspond to the counterparts of the first preferred embodiment, and the description thereof will not be reiterated.

In the second preferred embodiment, a partition 62 is provided in the downstream flow passage 40d adjacent to the spool 42 thereby forming a by-pass passage 63 above and parallel to the downstream passage 40d. As apparent from the drawing, the partition 51, which is located adjacently to the upstream flow passage 40c in the first preferred embodiment is removed, and a space 64 which is a part of the flow passage 40 is provided upstream of the spool 42. By so forming the by-pass passage 63, the same advantageous effects as the first preferred embodiment are obtained.

Figure 9:
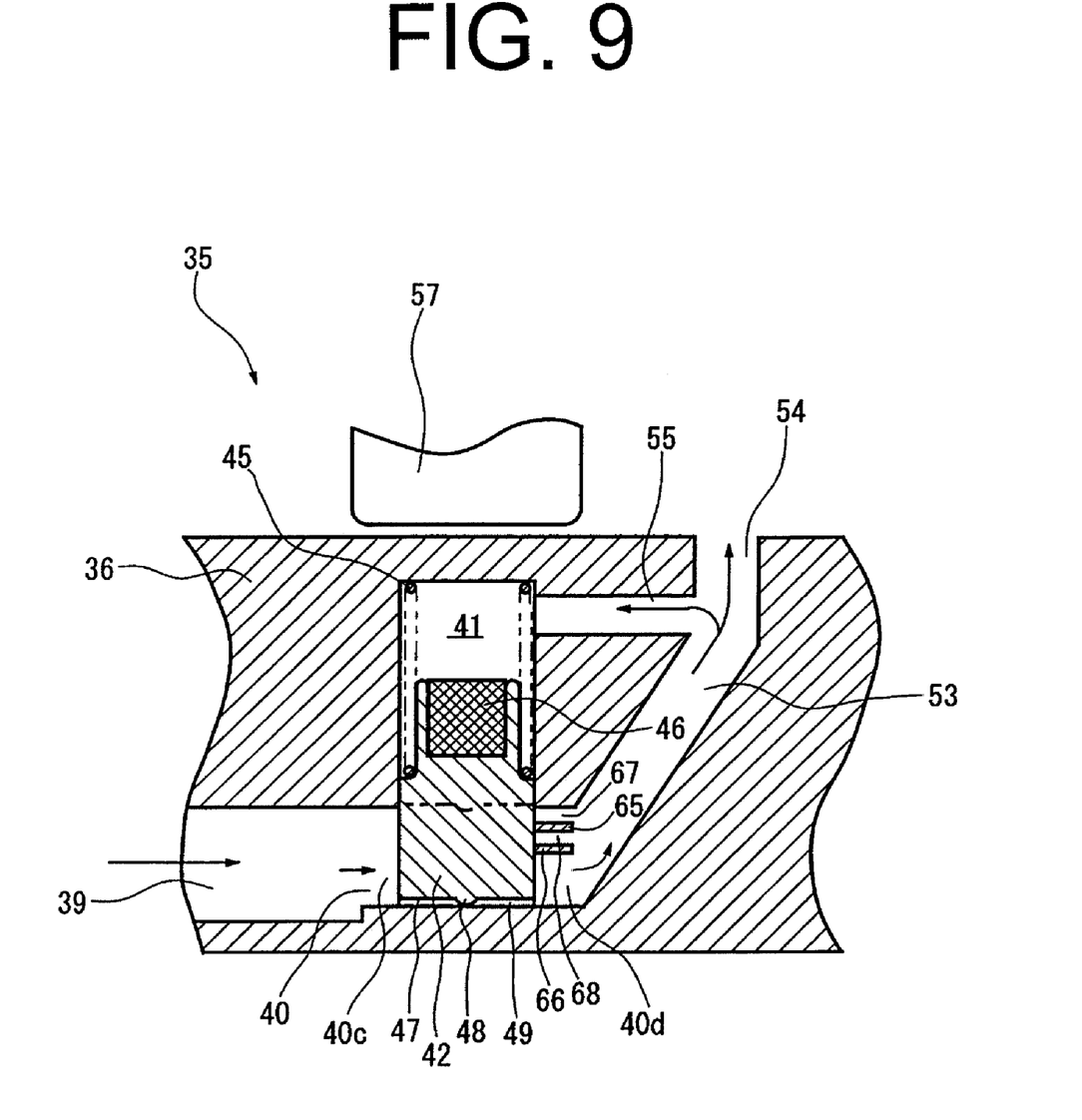
FIG. 9 is a partially enlarged cross-sectional view of a flow meter of a third preferred embodiment.

The following will describe a third preferred embodiment of a flow meter for a variable displacement compressor according to the present invention with reference to FIG. 9. The third preferred embodiment differs from the first preferred embodiment in that the by-pass passage 52 is modified. The same reference numerals will be used to denote those components or elements which correspond to the counterparts of the first preferred embodiment, and the description thereof will not be reiterated.

In the third preferred embodiment, two partitions 65 and 66 are provided in the downstream flow passage 40d adjacent to the spool 42 and are spaced in the axial direction of the spool 42 or in the vertical direction in FIG. 9. Thereby, a by-pass passage 67 is formed between the partition 65 and the flange 36, and another by-pass passage 68 is formed between the partitions 65 and 66. The by-pass passages 67 and 68 spaced in the axial direction of the spool 42 are sequentially opened as the spool 42 is moved upward in FIG. 9. Thus, the increase in the flow rate of the refrigerant gas flowing in the low-pressure chamber 53 takes place moderately as compared with the case of the first and second embodiments wherein one by-pass passage is formed and, therefore, the change in the differential pressure is easily adjustable. It is noted that the number of the by-pass passages is not limited to two but three or more by-pass passages may be provided. The provision of such a plurality of by-pass passages allows the increase of the refrigerant gas flow rate in the low-pressure chamber to be set in various or gradual ways. This contributes to making the change of differential pressure closer to a linear change in the high flow-rate region of the compressor.

Figure 10A:
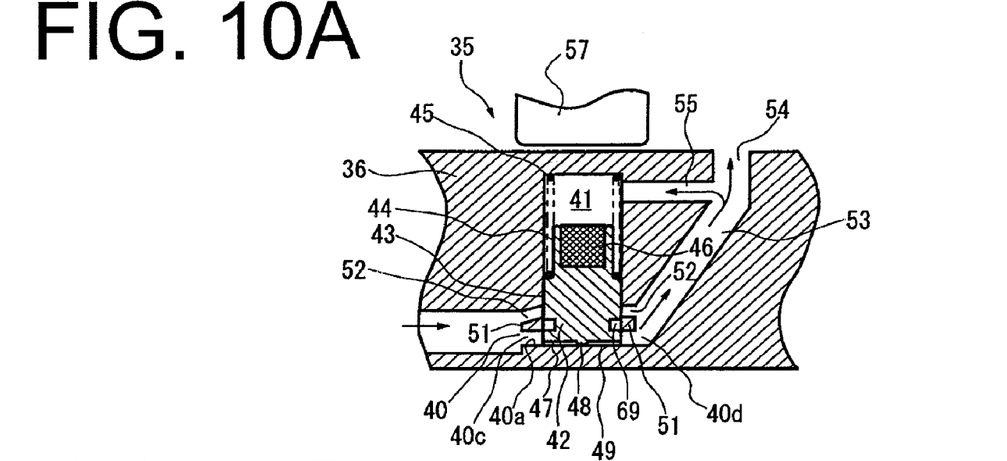
FIG. 10A is a partially enlarged cross-sectional view of a flow meter of a fourth preferred embodiment in a low flow rate region.
Figure 10B:
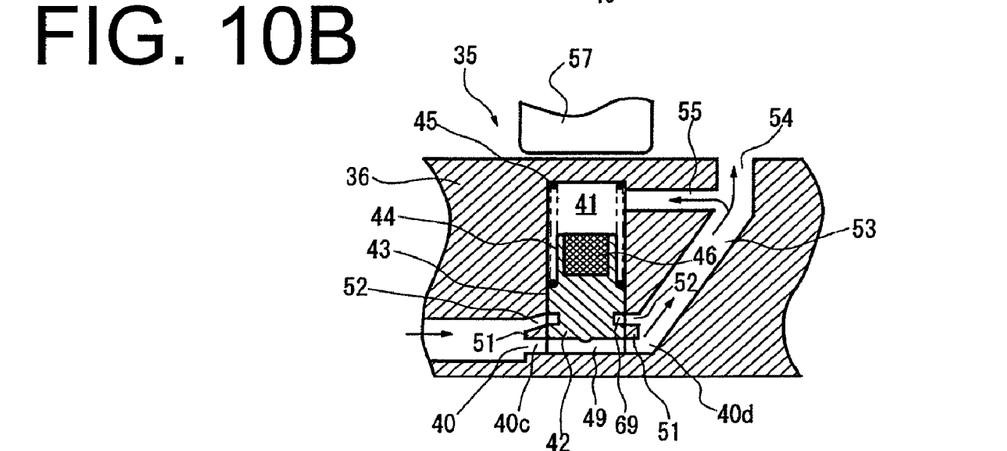
FIG. 10B is a partially enlarged cross-sectional view of the flow meter of the fourth preferred embodiment in an intermediate flow rate region.

The following will describe a fourth preferred embodiment according to the present invention with reference to FIGS. 10A through 10B. The fourth preferred embodiment differs from the first preferred embodiment in that the by-pass passage 52 is modified. The same reference numerals will be used to denote those components or elements which correspond to the counterparts of the first preferred embodiment, and the description thereof will not be reiterated.

The fourth preferred embodiment is substantially the same as the first preferred embodiment in that the partitions 51 are provided in the upstream and downstream passages 40c and 40d of the flow passage 40 and the by-pass passage 52 is formed. In the fourth preferred embodiment, an annular groove 69 is formed with a predetermined depth in the outer peripheral surface of the lower large-diameter portion 43 of the spool 42. When the spool 42 is fully urged into the flow passage 40, the groove 69 is located at a position where it is closed by the partitions 51. Thus, the groove 69 is opened and closed by the partitions 51 as the spool 42 is moved vertically.

The operation of the flow meter 35 of the fourth preferred embodiment is as follows. After the compressor has been started up, the upstream and downstream passages 40c and 40d are connected to each other through the slight clearance 49 in the low flow rate region as shown in FIG. 10A. Then, the spool 42 is moved upward by the differential pressure acting against the urging force of the coil spring 45.

When the flow rate of refrigerant gas is increased to reach an intermediate flow rate region, the spool 42 is moved upward by the differential pressure and the groove 69 thereof is released from the partitions 51. As shown in FIG. 10B, the by-pass passage 52 is connected to the upstream and downstream passages 40c, 40d by the groove 69, and the increased flow rate of the refrigerant gas flowing in the low-pressure chamber 53 is determined by the size of the groove 69.

The above increased flow rate can be set as desired by determining the depth and the width of the groove 69 based on the relation between the flow rate and the differential pressure as shown in FIG. 7. Thus, the most appropriate flow rate is ensured in the intermediate flow-rate region. In the fourth preferred embodiment, therefore, the flow rate of refrigerant gas is increased without deteriorating the differential pressure detection sensitivity with the result that the cooling capacity required in the intermediate flow-rate region is enhanced. Such enhancement of the cooling capacity improves the cooling efficiency to cool the vehicle interior rapidly and reduce the power for the compressor, thus greatly contributing to energy saving.

Figure 10C:
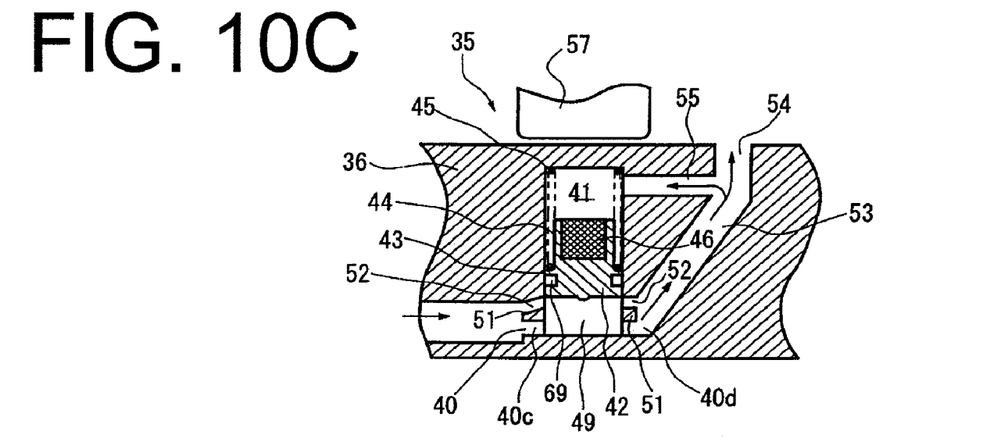
FIG. 10C is a partially enlarged cross-sectional view of the flow meter of the fourth preferred embodiment in a high flow rate region.

When the flow rate of refrigerant gas is further increased and the differential pressure becomes larger, the spool 42 is moved further upward until the by-pass passage 52 is fully opened as shown in FIG. 10C, and a large amount of refrigerant gas flows into the low-pressure chamber 53 through the flow passage 40 and the by-pass passage 52. As a result, the same advantageous effects as the above-described preferred embodiments are obtained.

It is noted that the operative position of the groove 69 relative to the by-pass passage 52 is determined by the distance for which the spool 42 moves from its fully-urged position. By setting the position of the groove 69 for the desired opening degree of the clearance 49 at a desired timing of opening the groove 69, the increasing timing of the flow rate for the intermediate flow rate region is optimally set as desired in a range from the intermediate flow-rate region to the high flow-rate region. Though only one groove 69 is provided in the fourth preferred embodiment, a plurality of annular grooves is optimally formed in the outer peripheral surface of the spool 42.

The present invention is not limited to the first through fourth preferred embodiments described above, but it may be practiced in various alternative embodiments as exemplified below.

(1) The by-pass passage which is shown in the first through fourth preferred embodiments may be formed at least adjacently to the downstream flow passage 40d downstream of the lower end surface 47 of the spool 42 as the pressure-receiving surface for obtaining the same advantageous effect as the preferred embodiments.

(2) The magnet 46 which is shown in the first through fourth preferred embodiments may be embedded in the lower end surface 47 of the lower large-diameter portion 43 of the spool 42, and the magnetic sensor 57 may be provided at any position below the magnet 46 as seen in the drawings.

(3) The vertical arrangement of the sealed chamber 41, the spool 42, the coil spring 45, the flow passage 40, the by-pass passage 52 and the communication passage 55 as shown in FIG. 3 for the first preferred embodiment may be reversed, and the magnet 46 may be embedded in the lower end surface 47 of the large-diameter portion 43 of the spool 42.

(4) The magnetic sensor 57 is spaced at a predetermined clearance from the flange 36 in the first through fourth preferred embodiments as described above. Alternatively, the magnetic sensor 37 may be provided in contact with the flange 36.

(5) Though the sealed chamber 41 and the spool 42 are cylindrical in the first through fourth preferred embodiments as described above, the sealed chamber 41 and the spool 42 may be polygon-shaped.

(6) An urging member or means for urging the spool 42 is not limited to the coil spring 45, but it may be provided by a bellows or the like.

(7) In the first preferred embodiment, the control valve 22 of the displacement control device 21 has been described as a flow control valve using differential pressure between two points In the present invention, torque of the compressor can be calculated based on the flow rate which is detected by the magnetic sensor 57. Thus, the control valve 22 may be replaced by a control valve which is connected to the suction chamber 13 through the first pressure-introducing passage 23 and operable to control in response to suction pressure of the compressor.

(8) In the first through fourth preferred embodiments, the sealed chamber 41 of the flow meter 35 is formed in the flange 36, which is a part of the housing 1. Alternatively, a sealed casing may be provided outside of the housing 1 for forming therein the sealed chamber 41.

Therefore, the present examples and embodiments are to be considered as illustrative and not restrictive, and the invention is not to be limited to the details given herein but may be modified within the scope of the appended claims.

What is claimed is:

1. A flow meter for a variable displacement compressor which comprises a housing having a plurality of cylinder bores, a drive shaft provided in the housing, pistons disposed in the cylinder bores and a swash plate provided on the drive shaft, the pistons being driven by the swash plate, an inclination angle of the swash plate being controlled for controlling a displacement of the compressor, the flow meter comprising:
    a movable body operable to move by differential pressure, wherein the movable body is arranged perpendicularly to the flow passage;
    a magnet provided in the movable body;
    a magnetic sensor for detecting change of magnetic flux density of the magnet;
    a flow passage for refrigerant gas which is discharged from the cylinder bores to flow therethrough;
    a sealed chamber connected perpendicularly to the flow passage and accommodating therein the movable body;
    an urging member for urging the movable body into the flow passage;
    a clearance formed between a movable body and an inner wall surface of the flow passage, wherein the clearance is always provided as a part of the flow passage;
    a by-pass passage opened and closed as the movable body is moved in an axial direction of the movable body; and
    a communication passage for introducing into the sealed chamber the refrigerant gas in a downstream flow passage of the flow passage which is located downstream of the movable body.

2. The flow meter according to claim 1, wherein a plurality of the by-pass passages are provided and spaced in the axial direction of the movable body.

3. The flow meter according to claim 1, wherein an annular groove is formed on an outer peripheral surface of the movable body and opened and closed by a partition which defines the by-pass passage.

4. The flow meter according to claim 3, wherein a position of the groove in the outer peripheral surface of the movable body is set so that the groove is closed by the partition when the movable body is fully urged into the flow passage.

5. The flow meter according to claim 1, wherein a projection is formed on a lower end surface of the movable body, the projection being brought into contact with the inner wall surface of the flow passage when the movable body is fully urged into the flow passage.

6. The flow meter according to claim 1, wherein the housing has a flange for forming the sealed chamber.

7. The flow meter according to claim 6, wherein the magnetic sensor is spaced at a predetermined clearance from the flange.

8. The flow meter according to claim 1, wherein the movable body is cylindrical.

9. The flow meter according to claim 1, wherein the movable body is a spool.

10. The flow meter according to claim 1, wherein the differential pressure is created by a pressure in the sealed chamber and a pressure in the flow passage.

11. The flow meter according to claim 1, wherein the urging member is a coil spring which is disposed in the sealed chamber.

12. A flow meter for a variable displacement compressor which comprises a housing having a plurality of cylinder bores, a drive shaft provided in the housing, pistons disposed in the cylinder bores and a swash plate provided on the drive shaft, the pistons being driven by the swash plate, an inclination angle of the swash plate being controlled for controlling a displacement of the compressor, the flow meter comprising:

a flow passage for flowing refrigerant gas which is discharged from the cylinder bores;

a sealed chamber connected perpendicularly to the flow passage;

a movable body operable to move in said sealed chamber by differential pressure; and at least one by-pass passage that is separate from said flow passage for being opened and closed when the movable body moves over a predetermined point in said sealed chamber for controlling an additional amount of the refrigerant gas to flow from the cylinder bores.

* * * * *